US006234292B1

(12) United States Patent
Schut

(10) Patent No.: US 6,234,292 B1
(45) Date of Patent: May 22, 2001

(54) PALLET RETAINER FOR A CONVEYOR

(75) Inventor: David S. Schut, Rockwood (CA)

(73) Assignee: Interroll Holding AG, San Antonino (CH)

( * ) Notice: Subject to any disclaimer, the term of this patent is extended or adjusted under 35 U.S.C. 154(b) by 0 days.

(21) Appl. No.: 09/368,287

(22) Filed: Aug. 4, 1999

(51) Int. Cl.[7] .......... B65G 13/00
(52) U.S. Cl. .......... 193/35 A; 198/463.6
(58) Field of Search .......... 193/35 A; 198/463.6, 198/459.7, 633

(56) References Cited

U.S. PATENT DOCUMENTS

| | | | | |
|---|---|---|---|---|
| 1,508,369 | | 9/1924 | Johnson . | |
| 2,794,534 | | 6/1957 | Forrester . | |
| 3,166,178 | | 1/1965 | Smith et al. . | |
| 3,520,422 | | 7/1970 | Bruce et al. . | |
| 3,532,201 | | 10/1970 | McConnell . | |
| 3,777,867 | | 12/1973 | Durwald . | |
| 3,891,073 | | 6/1975 | Coleman et al. . | |
| 3,990,557 | * | 11/1976 | Carder | 193/35 A |
| 4,096,939 | | 6/1978 | Riggs et al. . | |
| 4,136,763 | | 1/1979 | Pryor et al. . | |
| 4,185,729 | | 1/1980 | Obermeyer . | |
| 4,527,937 | | 7/1985 | Tomasello, Jr. . | |
| 4,542,815 | * | 9/1985 | Leemkuil | 193/35 A |
| 4,646,909 | * | 3/1987 | vom Stein | 198/460 |
| 4,809,836 | * | 3/1989 | Zilber | 193/35 A |
| 4,930,616 | * | 6/1990 | Lindberg | 198/463.6 |
| 5,109,971 | * | 5/1992 | Riner | 193/35 A |
| 5,168,976 | * | 12/1992 | Kettleson | 198/345.3 |
| 5,211,276 | * | 5/1993 | Clopton | 198/345.3 |
| 5,213,189 | * | 5/1993 | Agnoff | 193/35 A |
| 5,375,689 | * | 12/1994 | Sapp et al. | 193/35 A |
| 5,406,096 | * | 4/1995 | Clopton | 198/460 |
| 5,490,587 | * | 2/1996 | Fisher | 193/35 A |
| 5,655,425 | * | 8/1997 | Ruohio et al. | 83/27 |
| 5,676,235 | * | 10/1997 | Sam et al. | 198/345.3 |
| 5,890,577 | | 4/1999 | Faisant . | |
| 5,890,579 | | 4/1999 | Young . | |
| 5,911,297 | * | 6/1999 | Unterhuber | 193/35 A |
| 5,934,438 | * | 8/1999 | Hilerich, Jr. | 193/35 A |

* cited by examiner

*Primary Examiner*—Christopher P. Ellis
*Assistant Examiner*—Rashmi Sharma
(74) *Attorney, Agent, or Firm*—Coats & Bennett, PLLC

(57) ABSTRACT

A retainer for controlling the movement of objects along a conveyor including a substantially L-shaped retaining arm pivotally mounted to the conveyor and having a toe section and a leg section. A swing arm is pivotally connected to the leg section and includes a roller rotatably mounted to the second end of the swing arm. A biasing member has a first end attached to the conveyor frame and a second end attached to the swing arm. A link arm is connected to the roller and is selectively actuatable for moving the roller to a first position between the conveyor frame and the retaining arm for maintaining the leg section below the retaining arm pivot point and the toe section above the conveyor frame to stop the objects. The link arm is also actuatable to a second position in which the retaining arm pivot point, swing arm pivot point, and link arm are substantially aligned providing for the retaining arm toe section to be positioned below the retaining arm pivot point to allow the objects to pass on the conveyor.

24 Claims, 6 Drawing Sheets

PALLET RETAINER FOR A CONVEYOR

FIELD OF THE INVENTION

The present direction is directed to a retainer for controlling the movement of objects along a conveyor and, more particularly, to a retainer having a pivoting retaining arm selectively positionable such that one end pivots above and below the height of the conveyor.

BACKGROUND OF THE INVENTION

Typically, a conveyor system includes a plurality of rollers rotatably mounted in a conveyor frame so as to define a path upon which articles are conveyed. The conveyor may include drive rollers for moving the materials along the conveyor length, belts, or preferably the conveyor may be gravity fed having free-moving rollers. To most effectively utilize the conveyor, it is often necessary to separate the goods and control the positioning. This may be necessary to allow for a user to individually handle or remove a single object, effectively route the materials to the appropriate destination, or to ensure that adjacent materials do not come in contact which may cause damage to the materials.

One type of presently available system includes an electrically powered retaining arm. These systems provide for accurate control of goods along the conveyor, however, they are often expensive to install and require a large amount of maintenance to ensure they operate effectively. Additionally, powered conveyors are more effective when permanently positioned at a single station and are not effective for portable conveyors that are used in a variety of situations such as loading and unloading from trucks and loading docks. Powered retainers using electrically controlled retaining arms may also not be available for use in wet environments such as a loading dock, tractor-trailer, etc.

There have further been numerous mechanically operated retainer mechanisms. However, these often require many intricate moving parts that are susceptible to wearing out or being damaged during use. These mechanisms may also become stuck in position resulting in the retention of all goods on the conveyor, or potentially worse, fail to retain materials when a load is placed upon them.

Thus, a straight-forward mechanical retainer is needed that effectively separates materials along a conveyor without being prohibitively expensive or require a large amount of maintenance.

SUMMARY OF THE INVENTION

The present invention is directed to a retainer for controlling the movement of materials along a conveyor. The invention provides for a user to selectively actuate the retaining arm between a first position that extends above the conveyor for stopping goods moving on the conveyor, and a second position having the arm under the conveyor allowing for goods to move along the conveyor.

The invention includes a retaining arm mounted to the conveyor and having a first end and a second end and a pivoting about a point there-between. A swing arm is pivotally attached to the retaining arm and includes a roller that slides against and abuts a channel or conveyor frame applying a force to the retaining arm. A link rod is connected to the roller for moving between a first load blocking position having the roller between the conveyor frame and the retaining arm for positioning the downstream end of the retaining arm above the conveyor frame. The link rod can be positioned in a second load releasing position having the roller and swing arm extending outward from the retaining arm resulting in the downstream end of the retaining arm being below the conveyor frame.

Preferably, the retaining arm is substantially L-shaped having a toe section that extends above the conveyor height and a leg section. A biasing member may be attached between the conveyor and the roller to pull the roller to the first position between the conveyor frame and retaining arm. To assist in maintaining the roller in the first position with the toe above the conveyor height, the roller is preferably positioned over-center of said swing arm pivot point. Most preferably, the roller is just over center to ensure the retaining arm stays in position but does not require a large amount of force by the link rod to pull it into the second position.

Another embodiment of the invention features the swing arm pivotally attached to the retaining arm at a point below where the retaining arm is pivotally connected to the conveyor. This alignment provides for the retaining arm pivot point, swing arm pivot point, and link arm being substantially aligned when the swing arm is pulled by the link rod in the second position. This provides for the retaining arm to move about its pivot point to control the flow of materials on the conveyor.

DETAILED DESCRIPTION OF THE INVENTION

Figure 1:
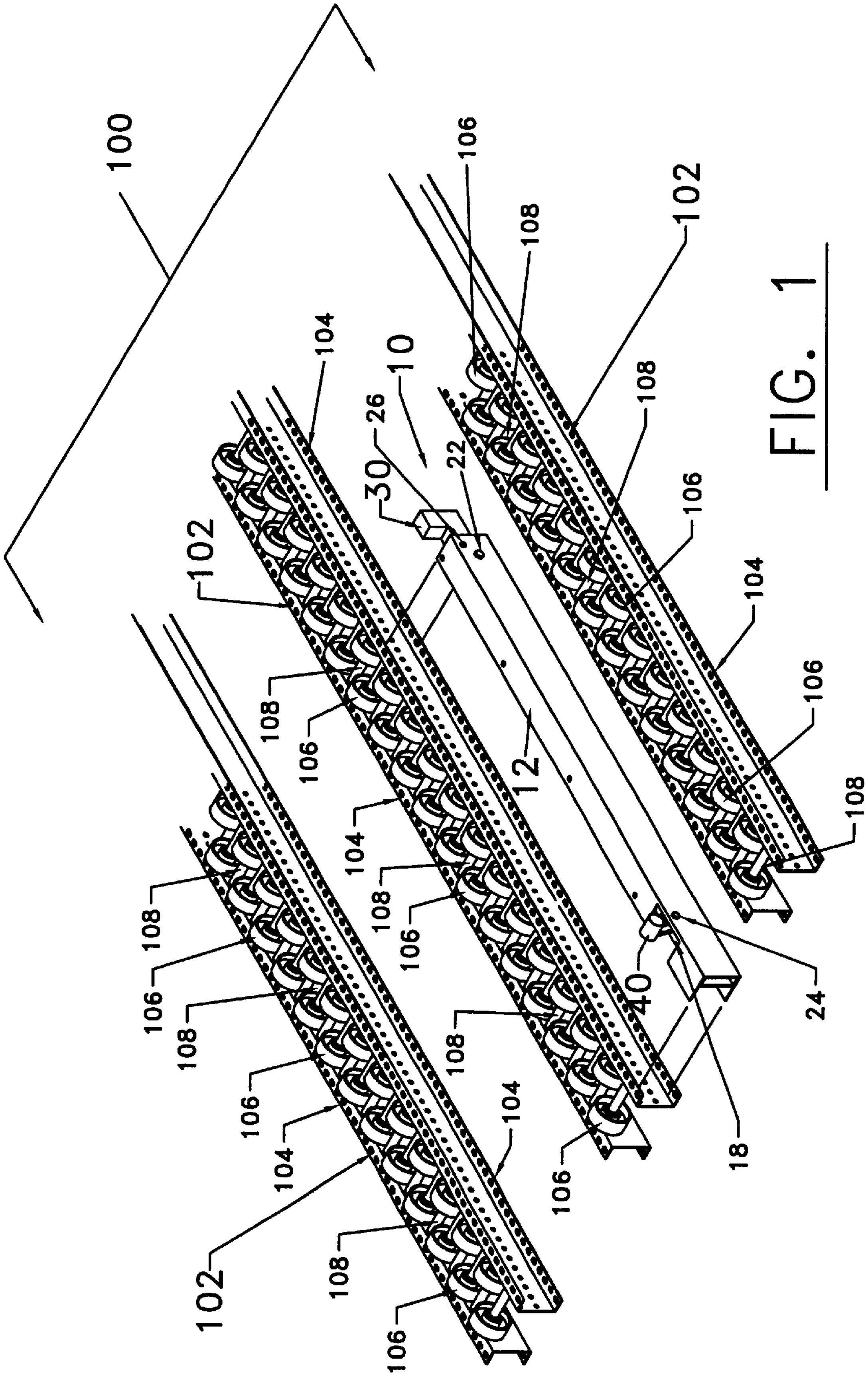
FIG. 1 is an exploded perspective view of the pallet retainer.

Referring now to the drawings, and particularly to FIG. 1, the pallet retainer of the present invention is shown therein and indicated generally by the numeral 10. The pallet retainer 10 is mounted to a conveyor 100. The roller conveyor 100 comprises three laterally spaced track assemblies 102 that are attached to a support frame (not shown). The track assemblies 102 are shown in FIGS. 1. Each track assembly 102 includes a pair of side rails 104 with a series of rollers 106 disposed between the side rails 104. The rollers 106 are mounted on roller shafts 108 that extend between the side rails 104. The roller shafts 108 can be fixed to the side rails 104 by any suitable means, such as by bolting or welding. In the disclosed embodiment, adjacent rollers 106 are staggered as shown in FIG. 1, however, it is understood that the present invention may be used on a variety of conveyor systems having various track assembly's and roller configurations.

The pallet retainer 10 mounts to one of the track assemblies 102 as shown in FIG. 1. In the disclosed embodiment, the pallet retainer 10 is mounted on the center track assembly 102, though it could mount to any of them. The purpose of the pallet retainer 10 is to engage loads on the conveyor and prevent the loads from moving downstream until released.

The pallet retainer 10 generally includes a housing 12, a load stop 30, an actuator 40, and a link assembly 50. The housing 12 encloses the other components and provides a means for mounting the pallet retainer 10 to the conveyor 100. The load stop 30 engages loads on the conveyor 100 to prevent the loads from moving further downstream until released. The load stop 30 is movable between a load blocking position in which loads are blocked, and a load releasing position in which loads are released. The actuator 40 is used to move the load stop 30 between the load blocking and load releasing positions. The link assembly 50 connects the actuator to the load stop 30.

Figure 6:
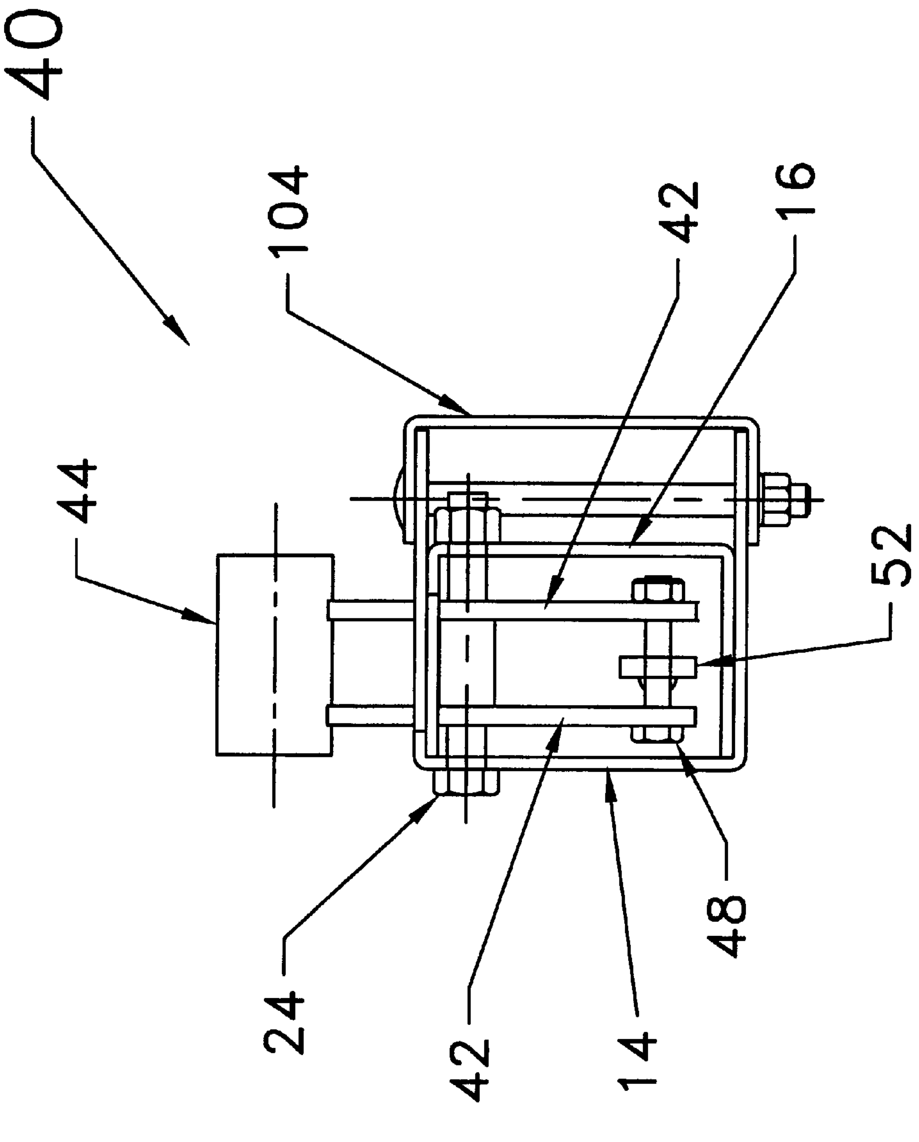
FIG. 6 is a cross-sectional of the pallet retainer taken through line 6—6 of FIG. 2.

The housing assembly 12 comprises two nested channels, referred to herein as the outer channel 14 and the inner channel 16. The outer and inner channels 14, 16 are sized so that the inner channel 16 nests inside the outer channel 14 as best seen in FIG. 6. The outer channel 14 and inner channel 16 define an enclosed space that contains the link assembly 50. The load stop 30 extends from one end of the nested channels 14, 16. The actuator 40 extends through an opening 18 formed in the top flanges of the nested channels 14, 16.

The channels 14, 16 are held together by bolts 22, 24 which pass through aligned bolt holes (not shown) at opposite ends of the channels 14, 16. As will be described below, the bolts 22, 24 also serve as pivot members for the load stop 30 and actuator 40, respectively.

Figure 2:
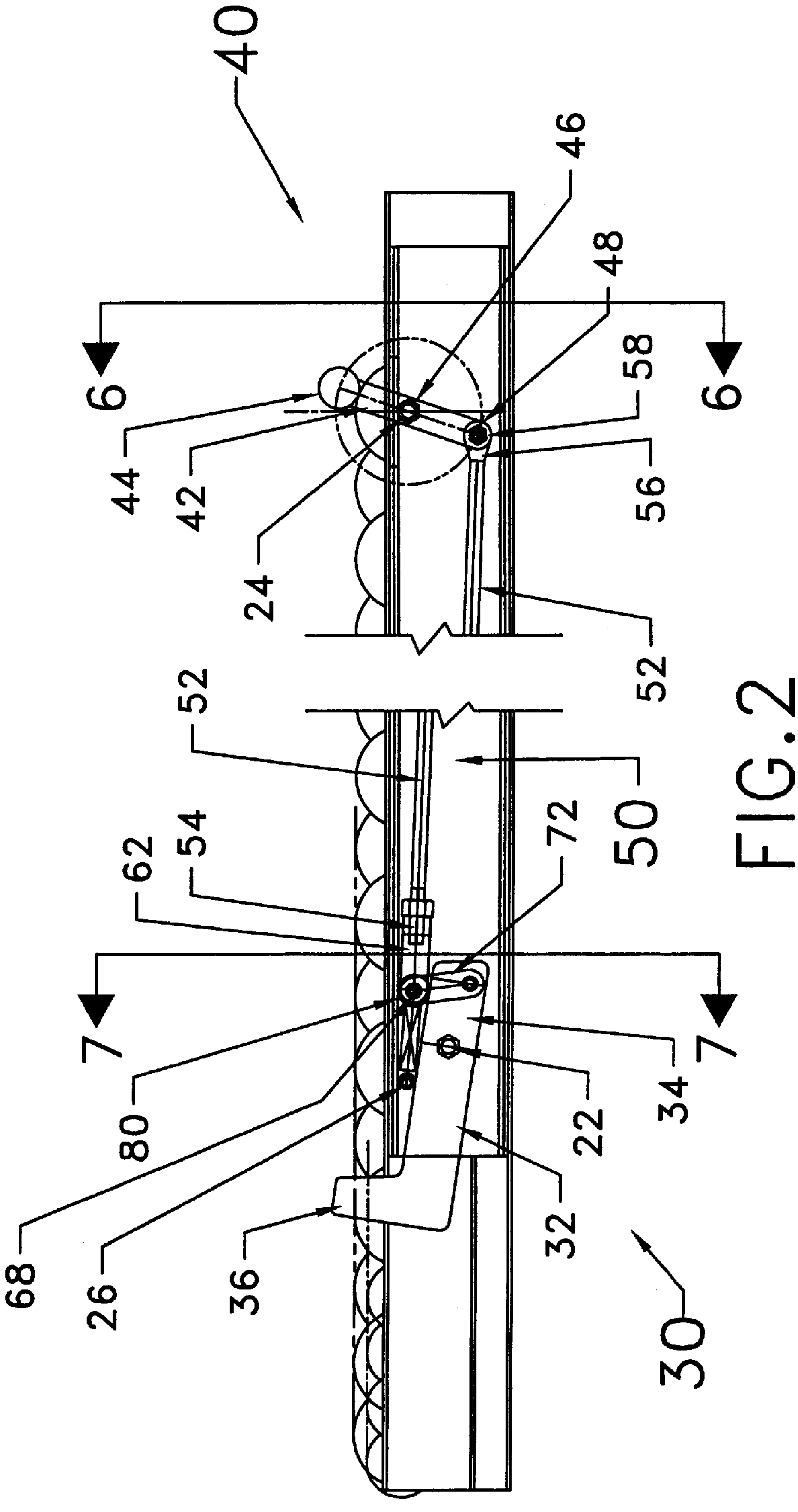
FIG. 2 is a side view illustrating the pallet retainer in the load blocking position.
Figure 3:
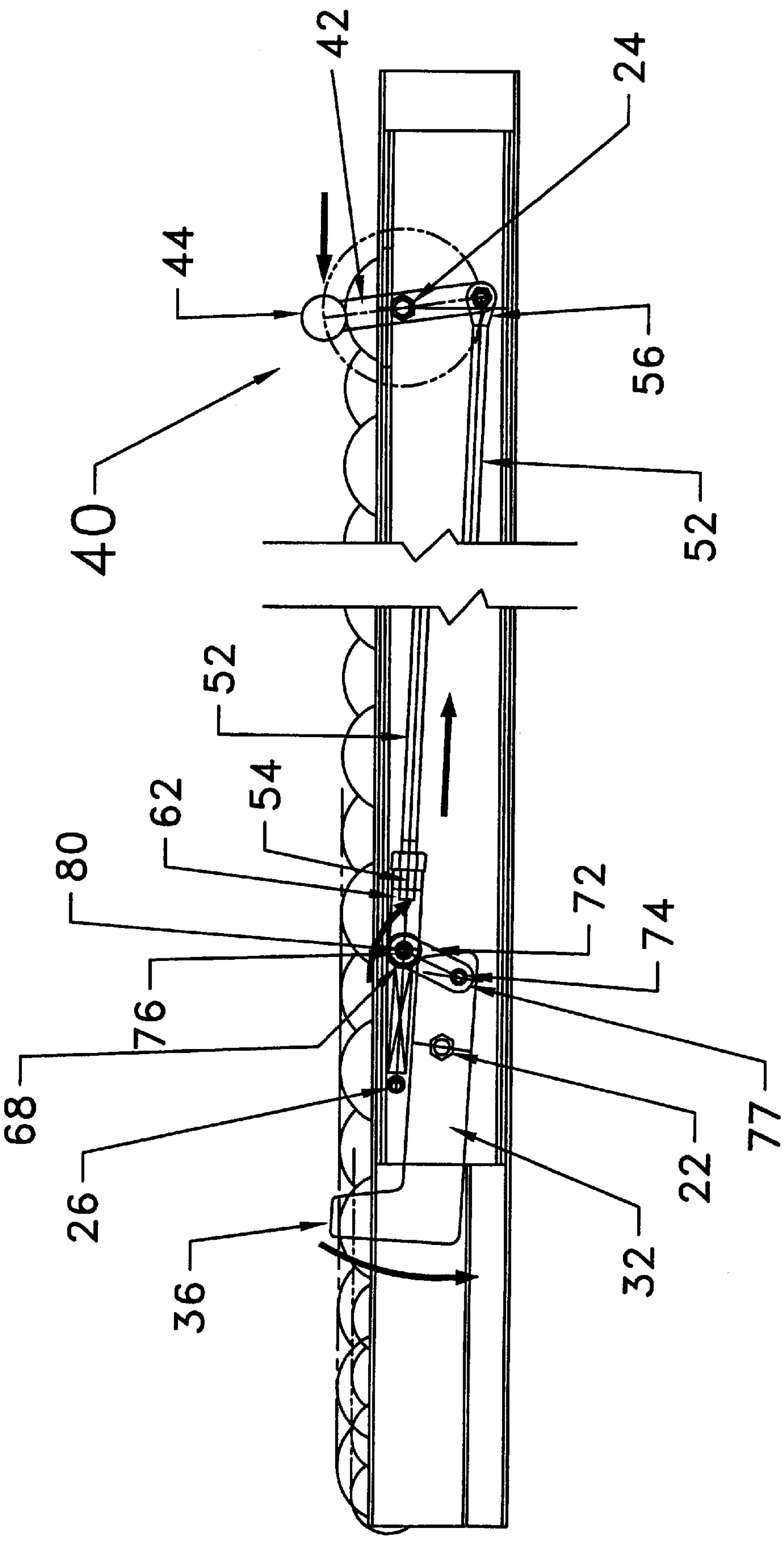
FIG. 3 is a side view illustrating the pallet retainer moving between the load blocking position and the load releasing position.
Figure 4:
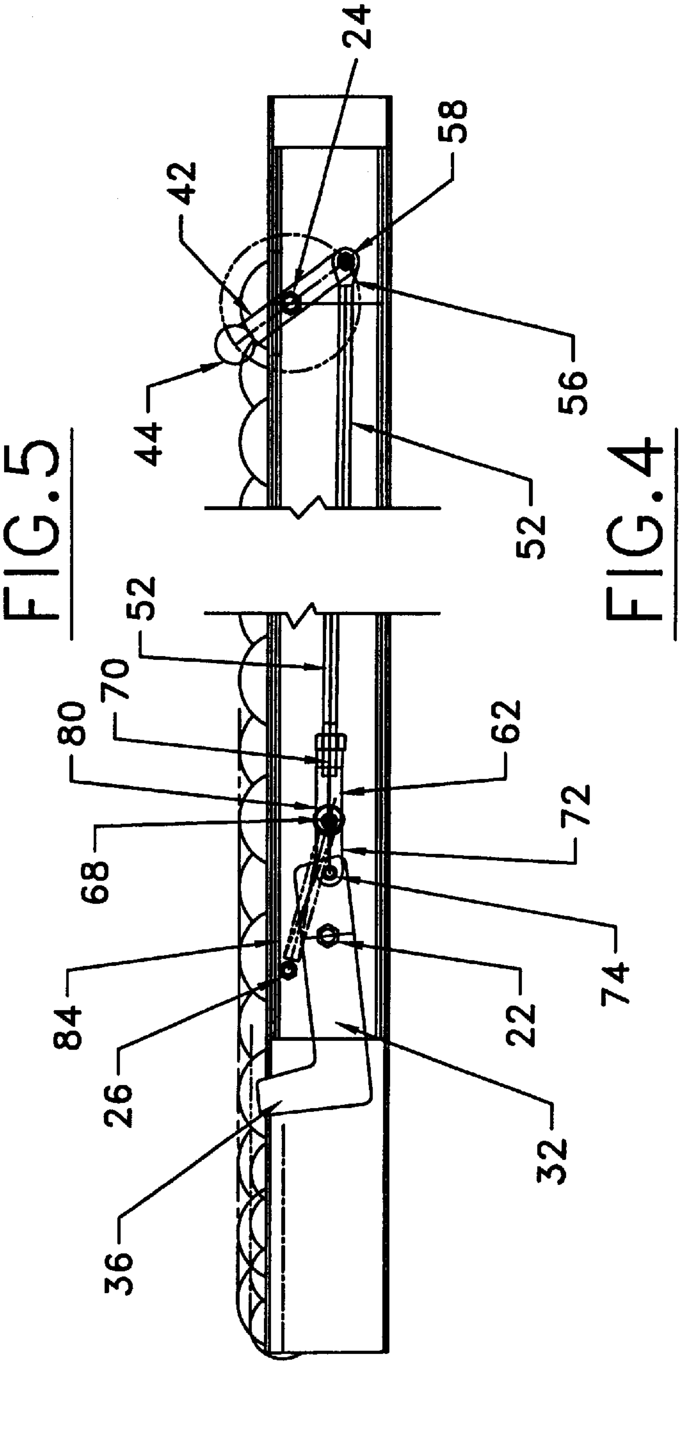
FIG. 4 is a side view of the load retainer in the releasing position.

The load stop 30, shown in FIGS. 2–4, comprises an L-shaped rigid body 32 that is pivotally mounted at one end of the nested channels 14, 16. The rigid body 32 includes a rear portion 34 and a forward load engaging portion 36. The rigid body 32 is mounted for pivotal movement about a fixed axis and extends from one end of the nested channels 14, 16. The rigid body 32 is movable about the fixed axis between a load engaging position (shown in FIG. 2) and a load releasing position (shown in FIG. 4). More particularly, the rigid body 32 pivots about bolt 22, which passes through a pivot opening in the rigid body 32. Thus, bolt 22 functions as a pivot member for the rigid body 32. In the load blocking position, the load engaging portion 36 extends above the top surface of the rollers 106 to block loads being conveyed, as seen in FIG. 2. In the load releasing position, the load portion member 36 is lowered below the conveying surface, as seen in FIG. 4, so loads are free to move downstream.

The actuator 40 moves the load stop 30 between the load blocking and load releasing positions. The actuator 40 is mounted upstream from the load stop 30, though it could also be mounted downstream. The actuator 40 comprises a lever 42 with a handle 44 at its upper end. Lever 42 pivots about a fixed axis between a first position illustrated in FIG. 2 and second position illustrated in FIG. 4. The lever 42 includes a pivot opening 46 at a central portion thereof through which bolt 24 passes. Thus, bolt 24 functions as a pivot member for the lever 42. The lower end 48 of the lever 42 is connected to the link assembly 50.

Link assembly 50 operatively connects the lever 40 to the load stop 30. When the lever 40 is in the first position (shown in FIG. 2), the load stop 30 assumes a load blocking position. Conversely, when the lever 40 is in the second position (shown in FIG. 4), the load stop 30 assumes a load releasing position.

Link assembly 50 is a planar linkage including two or more free-floating links. In the preferred embodiment, the link assembly has only two floating link elements, though more than two could be used. The disclosed embodiment of the link assembly 50 includes a link rod 52 and a pair of parallel swing arms 72 illustrated in FIG. 7. The link rod 52 functions as a first floating link element. The swing arms 72 function as a second floating link element. For purposes of this application, the term floating link element means a link element whose pivot points are movable. The link rod 52 is connected at one end to the actuator 40 and at the opposite end to the swing arms 72. The swing arms 72 are connected at one end to the load stop 30 and at the opposite end to the link rod 52.

Figure 5:
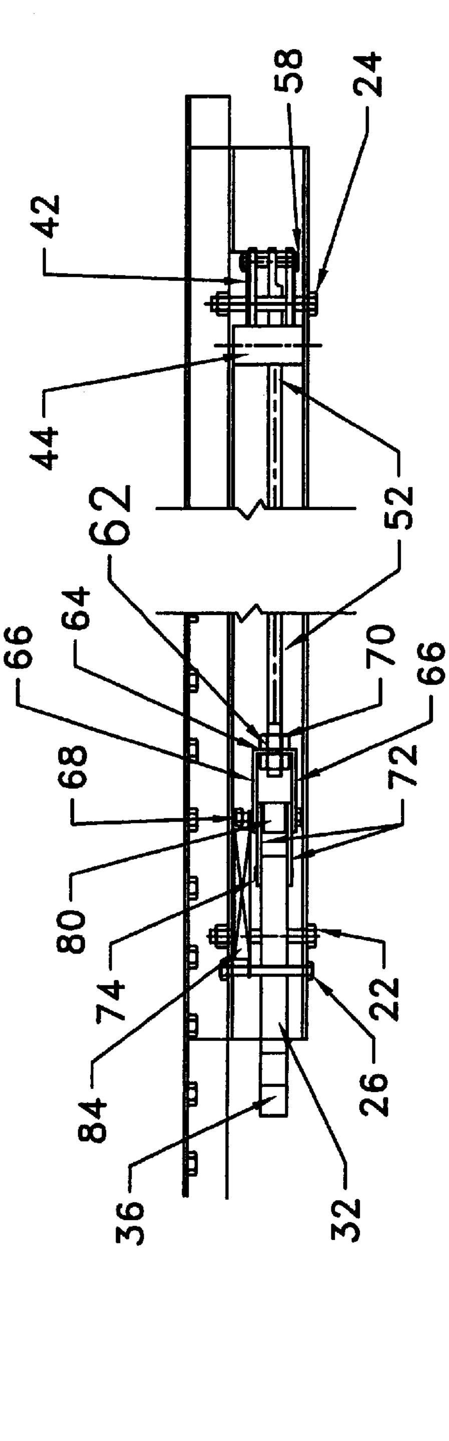
FIG. 5 is a top view of the load retainer in the load releasing position.

The link rod 52 includes a forward end 54 and a rearward end 56. The rearward end 56 of the link rod 52 is pivotally connected to the lower end of the lever 40 to from a hinge joint 48 that permits rotational movement between the link rod 52 and lever 42. The link rod 52 includes a flattened portion with an opening (not shown) therein to receive a fastener 58. Fastener 58 pivotally connects the rear end 56 of link rod 52 to the lower end 48 of the lever 42 to make the hinge joint 48. The hinge joint 48 defines a first movable pivot point for the link assembly 50. The forward end 54 of the link rod 52 is connected to the swing arms 72 by a unshaped clevis 62. Clevis 62 has a base member 64 and a pair of arms 66 as best seen in FIG. 5. Clevis 62 is mounted to the forward end 54 of the link rod 52. The forward end 54 of the link rod 52 is externally threaded and passes through an opening (not shown) in the base member 64 of the clevis 62. The clevis 62 is rigidly secured on the link rod 52 by nuts 70, which allow for some adjustment to the effective length of the link rod 52. The arms 66 of the clevis 62 are connected to the upper end of respective swing arms 72 by a fastener 68, such as a clevis pin or bolt and nut combination, to form a hinge joint 76 that permits rotational movement between the link rod 52 and swing arms 72. Hinge joint 76 defines a second movable pivot point for said link assembly 50. A roller 80, whose function is described below, is disposed between the arms 66 of the clevis 62 and is rotatably journalled on the fastener 68. Thus, fastener 68 functions as an axle for the roller 80.

Figure 7:
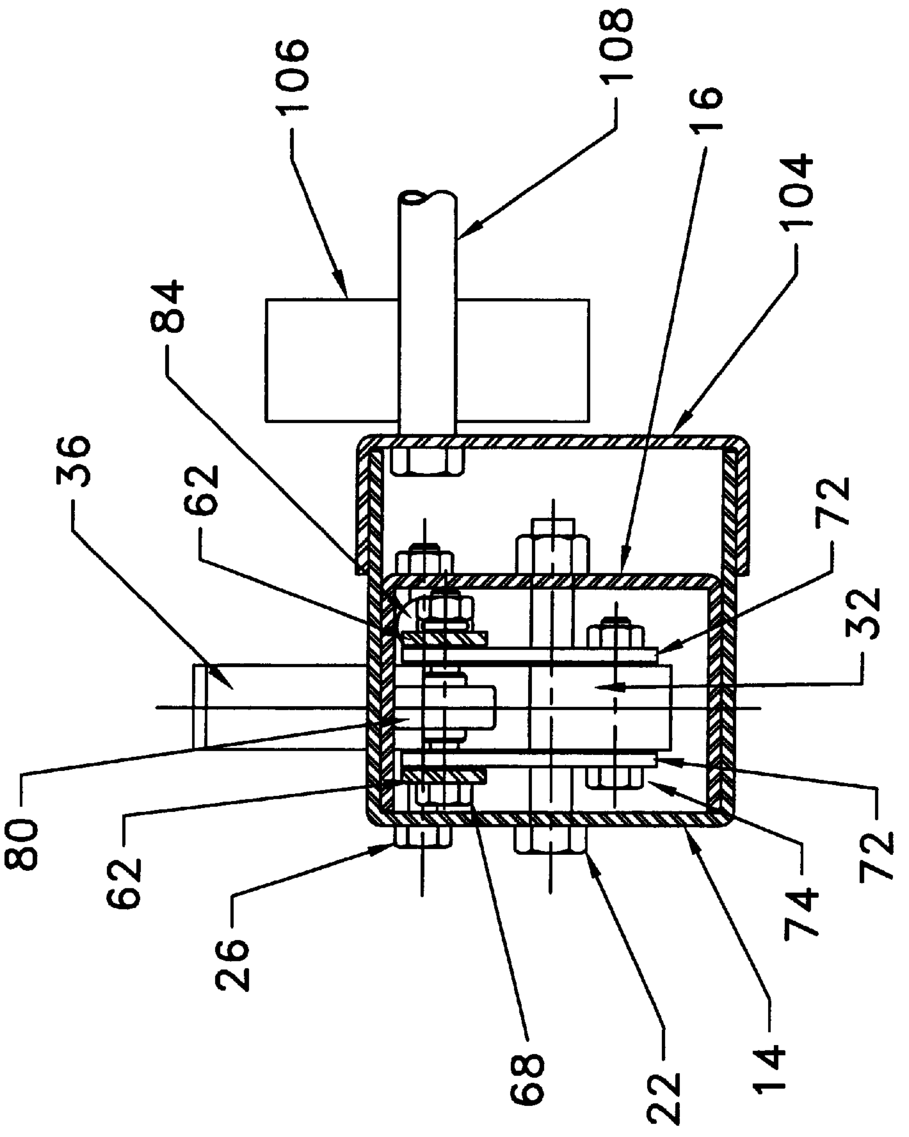
FIG. 7 is a cross-sectional view of the pallet retainer taken through line 7—7 of FIG. 2.

The swing arms 72 connect the forward end 54 of the link rod 52 to the load stop 30. The swing arms 72 are disposed on opposite sides of the load stop 30, as seen in FIGS. 5 and 7. The swing arms 72 are secured to the rear portion 34 of the load stop 30 by a fastener 74, such as a clevis pin or bolt and nut combination, to form a third hinge joint 77. Hinge joint 77 defines a third moving pivot point for the link assembly 50. In the preferred embodiment of the invention, hinge joint 77 is disposed below the fixed axis of the load stop 30 when the rigid body 32 is in a horizontal position. While two swing arms 72 are disclosed, those skilled in the art will appreciate that only one is required.

In a preferred embodiment, a biasing member 84, such as a tension coil spring, urges the entire assembly to the load blocking position. One end of the spring 84 is connected to fastener 68. The opposite end is connected to a bolt 26.

In use, the rigid body 32 pivots between the first load blocking position illustrated in FIG. 2 and second load releasing position illustrated in FIG. 4. In the load blocking position, the hinge joint 76 is displaced forward of hinge joint 77 to an over-center position and the roller 80 and trapped against the inner surface of the channel 16. The swing arms 72 push downward on the rear end 34 of the rigid body 32 to hold the rigid body 32 in the load blocking position. In this position, the load engaging portion 36 extends above the surface of the conveyor 100 to block loads travelling down the conveyor 100. The "over-center" position of hinge joint 76 relative to hinge joint 77 prevents the roller 80 and swing arm 72 from rotating when a load pushes against the load engaging portion 36. By contrast, if hinge joint 76 was positioned short of the center line of hinge joint 77, a force on the load engaging portion 36 could cause the swing arm 32 to rotate clockwise, as shown in FIG. 2, resulting in the release of loads held by the load stop 30. Preferably, the hinge joint 76 is not placed a large degree over the center line of hinge joint 77 because this may cause the roller 80 to become locked against the channel 16 requiring a larger amount of force to be applied to move the load stop 30 to the load releasing position. The biasing member 84 assists in pulling the roller 80 into the first position, but may not be enough force to maintain the roller 80 when a load is placed on the load stop 30.

To release a load, the actuator 40 is pushed forward. When the actuator 40 is pushed forward to the second position, the link rod 52 is pulled back in the direction of arrow A in FIG. 3. At the start of this rearward motion, the roller 80 is constrained by the channel 16 to follow a linear path defined by the inner surface of the channel 16. Eventually, the rotation of the swing arm 72 moves the roller 80 in an arc away from the channel 16. Further rearward movement of the link rod 52 causes the swing arm 72 to lift up on the rear portion 34 of the rigid body 32 to rotate it the load releasing position. When the actuator 40 is pushed all the way forward, swing arms 72 rotate downward so that the hinge joints 76 and 77 lie in a straight line with the fixed axis of the load stop. In this position, the swing arms 72 rotate the load stop 30 to the load releasing position. When the actuator 40 is released, the link rod 52 is pulled forward by the biasing member 84. As the link rod 52 moves forward, the swing arm 72 rotates up until the roller 80 once again contacts the surface of the channel 16 which acts as a guide. At this point, the movement of the roller 80 and hinge joint 76 is further constrained against vertical translational movement by the channel 16 and travels forward in a linear path. By preventing vertical translational movement of the hinge joint 76, the channel 16 causes the swing arm 72 to apply a downward force on the rear end of the load stop 30 as the link rod 52 is moves forward. That is, once the roller 80 engages the channel, further forward movement of the link rod 52 causes the swing arms 32 to rotate and push down on the load stop 30. The force applied by the swing arms 72 to the load stop 30 rotates the load stop 30 to the load blocking.

Those skilled in the art will be appreciate that the link assembly can be differently arranged and achieve the same results. For example, the swing arms could rotate downward instead of upward and engage the bottom flange of the channel 16. In this arrangement, the swing arms 72 would push up on the load stop 30 when the link rod 52 moves forward to rotate the load stop 30 to the load releasing position. The common element is that translational movement of the link assembly is constrained causing the link assembly to exert a force on the load stop 30.

Certain modifications and improvements will occur to those skilled in the art upon a reading of the foregoing description. In the foregoing description, like referenced characters designate like corresponding parts throughout the several views. Also, it is to be understood that such terms as “forward”, “rearward”, “left”, “right”, “upwardly”, “downwardly”, “upstream”, and “downstream”, and the like are words of convenience and are not to be construed as limiting terms. It should be understood that all such modifications have been deleted herein for the sake of conciseness and readability but are properly with the scope of the following claims.

What is claimed is:

1. A load retainer for a conveyor comprising:

a. a load stop movable between a load blocking position and a load releasing position;

b. a swing arm connected to said load stop so as to pivot about a first axis between first and second angular positions;

c. a roller mounted to an end of said swing arm;

d. a link rod connected to said swing arm for rotating said swing arm between said first and second angular positions; and e. a guide disposed in the path of the roller for engaging said roller as the swing arm rotates between said first and second angular positions, wherein further rotation of said swing arm after said roller has engaged said guide causes the swing arm to exert a force on said load stop tending to rotate the load stop to one of said load blocking and load releasing positions.

2. The load retainer of claim 1, wherein said load stop rotates about a fixed axis between said load blocking position and said load releasing position.

3. The load retainer of claim 2, wherein said guide limits translational movement of said swing arm in a vertical direction while allowing rotational movement of said swing arm.

4. The load retainer of claim 3, wherein said swing arm, after engaging said guide, rotates said load stop about said fixed axis to the load blocking position.

5. The load retainer of claim 1, further including a biasing member to bias said swing arm to one of said first and second angular positions.

6. The load retainer of claim 5, wherein said biasing member comprises a spring.

7. The load retainer of claim 1, wherein said swing arm includes first and second pivot points.

8. The load retainer of claim 2, wherein said swing arm is connected to said load stop at a first movable pivot point and is connected to said link rod at a second movable pivot point, wherein said first and second movable pivots align with said fixed axis of said load stop when said load stop is in the load releasing position.

9. The load retainer of claim 8, wherein said second pivot point is displaced forward of said first pivot point to an over-center position when said load stop is in the load blocking position to prevent loads engaging said load stop from rotating said swing arm.

10. A load stop for a conveyor comprising:

a. a load stop movable between a load blocking position and a load releasing position;

b. an actuator movable between first and second positions;

c. a planar link assembly connecting said actuator to said load stop so that said load stop assumes a load blocking position when the actuator is in the first position and a load releasing position when the actuator is in the second position, said link assembly including at least two link members connected by a first hinge joint;

d. means to limit the translational movement of said link assembly while allowing rotational movement between said link members such that the link assembly exerts a force on the load stop tending to move the load stop to one of the load blocking or load releasing positions when said translational limit is reached.

11. The load retainer of claim 10, wherein said load stop is mounted for rotational movement.

12. The load retainer of claim 11, wherein said means to limit translational movement of said link assembly includes a guide surface engaged by said linkage.

13. The load retainer of claim 12, further including a roller mounted to said linkage for engaging said guide surface.

14. The load retainer of claim 11, wherein said link assembly, after engaging said guide, rotates said load stop about said fixed axis to the load blocking position.

15. The load retainer of claim 10, wherein said biasing member comprises a spring.

16. A load retainer for a conveyor comprising:

a. an actuator movable between first and second positions;

b. a load stop movable between a load blocking position and a load releasing position;

c. a link assembly connecting said actuator to said load stop so that said load stop assumes a load blocking position when the actuator is in the first position and a load releasing position when the actuator is in the second position, said link assembly comprising;

1. a link rod connected to said actuator;
2. a swing arm connected between said link rod and said retaining arm;
3. a roller mounted at one end of said swing a nd d. a guide for engaging said roller and constraining the movement of said swing arm such that swing arm exerts a force on the load stop to move the load stop between the load releasing position and the load blocking position.

17. A load retainer for controlling the movement of materials along a conveyor comprising:

a. a load stop movable between a load blocking position and a load releasing position;

b. an actuator movable between first and second positions;

c. a planar link assembly connecting said actuator to said load stop so that said load stop assumes a load blocking position when said actuator is in the first position and a load releasing position when said actuator is in the second position, said planar link assembly including at least two link members connected by a first hinge joint;

d. a support surface positioned adjacent to said planar link assembly such that said first hinge joint contacts said support surface to move said load stop to the load blocking position.

18. The load retainer of claim 17, wherein said load stop pivots about a first axis between said load blocking and said load releasing positions.

19. The load retainer of claim 17, further including a biasing member to bias said planar link assembly to one of said first and second positions.

20. The load retainer of claim 17, wherein said actuator comprises a lever that is pivotally mounted for movement between said first and second positions.

21. The load retainer of claim 17, further including a roller rotatably attached to said first hinge joint for contacting said support surface.

22. A load retainer for a conveyor comprising:

a. a load stop movable between a load blocking position and a load releasing position;

b. a swing arm connected to said load stop so as to pivot about a first axis between first and second angular positions;

c. a link rod connected to said swing arm at a hinge pivot for rotating said swing arm between said first and second angular positions; and d. a guide disposed in the path of the swing arm for engaging said hinge pivot as the swing arm rotates between said first and second angular positions, wherein further rotation of said swing arm after said roller has engaged said hinge pivot causes the swing arm to exert a force on said load stop tending to rotate the load stop to one of said load blocking and load releasing positions.

23. A conveyor for moving and separating articles comprising:

a. a conveyor frame having at least one pair of side rails;

b. a plurality of rollers disposed between said side rails;

c. a load stop movable about a first fixed point and positionable between a load blocking position that extends above the height of said rollers and a load releasing position that is positioned below the height of said rollers;

d. an actuator movable about a second fixed point and positionable between first and second positions; and e. a planar link assembly positioned between said load stop and said actuator having a pair of linkages with a first moving pivot point connecting a first linkage to said actuator, a second moving pivot point connecting said first linkage to a second linkage, and a third moving pivot point connecting said second linkage to said load stop, wherein said actuator positions said second moving pivot point relative to said conveyor frame for selectively positioning said retaining arm between said load blocking and load releasing positions.

24. The conveyor of claim 23, wherein said conveyor is gravity-fed.

* * * * *